(12) United States Patent
Sethu et al.

(10) Patent No.: US 12,459,359 B2
(45) Date of Patent: Nov. 4, 2025

(54) SITUATIONAL RECOMMENDATIONS AND CONTROL

(71) Applicants:GM Global Technology Operations LLC, Detroit, MI (US); University of Ottawa, Ottawa (CA)

(72) Inventors: Ramesh Sethu, Troy, MI (US); Arun Adithan, Sterling Heights, MI (US); Md Mhafuzul Islam, Warren, MI (US); Prakash M. Peranandam, Rochester Hills, MI (US); Amirhossein Zolfagharian, Ottawa (CA); Zohreh Aghababaeyan, Ottawa (CA)

(73) Assignees: GM Global Technology Operations LLC, Detroit, MI (US); University of Ottawa, Ottawa (CA)

( * ) Notice: Subject to any disclaimer, the term of this patent is extended or adjusted under 35 U.S.C. 154(b) by 267 days.

(21) Appl. No.: 18/460,952

(22) Filed: Sep. 5, 2023

(65) Prior Publication Data

US 2025/0074443 A1    Mar. 6, 2025

(51) Int. Cl.
*B60K 35/26* (2024.01)
*B60K 35/10* (2024.01)
(Continued)

(52) U.S. Cl.
CPC ............ *B60K 35/265* (2024.01); *B60K 35/28* (2024.01); *B60W 50/0097* (2013.01);
(Continued)

(58) Field of Classification Search
CPC ...... B60K 35/265; B60K 35/28; B60K 35/10; B60K 2360/119; B60K 2360/1438; B60K 2360/1468; B60K 35/00; B60W 50/0097; B60W 50/14; B60W 2050/0029; B60W 2050/143; B60W 2050/146; B60W 2420/54; B60W 2540/21; B60W 2540/215; B60W 2556/10; B60W 2556/65;
(Continued)

(56) References Cited

U.S. PATENT DOCUMENTS

| 2014/0079285 A1* | 3/2014 | Yamashita | ................ G06T 7/20 382/103 |
| 2017/0217446 A1* | 8/2017 | Halder | .................. B60W 50/14 |

(Continued)

*Primary Examiner* — Omeed Alizada
(74) *Attorney, Agent, or Firm* — Vivacqua Crane, PLLC (57) ABSTRACT

A system for providing situational recommendations within a vehicle includes a system controller in communication with a plurality of onboard sensors, the plurality of onboard sensors adapted to collect real-time data related to a location of the vehicle and operating conditions of the vehicle, a database in communication with the system controller adapted to store data related to past actions and data related to a location of the vehicle and operating conditions of the vehicle when such past actions occurred, the system controller including a driver specific machine learning model adapted to predict a desired action based on the real-time data related to the location and operating conditions of the vehicle and data from the database, the system controller further adapted to initiate the predicted desired action, receive input from an occupant within the vehicle, and update the driver specific machine learning model.

20 Claims, 5 Drawing Sheets

(51) Int. Cl.
*B60K 35/28* (2024.01)
*B60W 50/00* (2006.01)
*B60W 50/14* (2020.01)

(52) U.S. Cl.
CPC ............ *B60W 50/14* (2013.01); *B60K 35/10* (2024.01); *B60K 2360/119* (2024.01); *B60K 2360/1438* (2024.01); *B60K 2360/1468* (2024.01); *B60W 2050/0029* (2013.01); *B60W 2050/143* (2013.01); *B60W 2050/146* (2013.01); *B60W 2420/54* (2013.01); *B60W 2540/21* (2020.02); *B60W 2540/215* (2020.02); *B60W 2556/10* (2020.02); *B60W 2556/65* (2020.02)

(58) Field of Classification Search
CPC ..... B60R 16/023; B60Q 9/00; G06F 3/04817; G06F 3/0488; G06F 16/9535; G06N 20/00
See application file for complete search history.

(56) References Cited

U.S. PATENT DOCUMENTS

2018/0029612 A1\* 2/2018 Tsuyunashi ........... B60W 40/04
2018/0053102 A1\* 2/2018 Martinson .......... G08G 1/09623
2018/0053108 A1\* 2/2018 Olabiyi ................. G06N 3/044

\* cited by examiner

SITUATIONAL RECOMMENDATIONS AND CONTROL

INTRODUCTION

The present disclosure relates to a system and method for providing recommended actions to an occupant within a vehicle.

Vehicles are equipped with many sensors to monitor the environment surrounding the vehicle, and to provide warnings when objects get to close, etc. In many instances, an occupant within a vehicle takes a specific action, such as opening a glove box or closing a window each time that occupant arrives at a specific location or when certain conditions exist. Further, in modern vehicles, often the ability to activate certain actions requires an occupant within the vehicle to navigate through multiple menus on a display screen.

Thus, while current systems and methods achieve their intended purpose, there is a need for a new and improved system and method for providing recommendations to an occupant within a vehicle by receiving input from sensors and predicting a desired action and initiating the desired action either automatically, or by prompting the occupant within the vehicle.

SUMMARY

According to several aspects of the present disclosure, a method of providing situational recommendations within a vehicle includes collecting, with a plurality of onboard sensors in communication with a system controller, real-time data related to a location of the vehicle and operating conditions of the vehicle, accessing, with the system controller, a database of stored data related to past actions and data related to a location of the vehicle and operating conditions of the vehicle when such past actions occurred, predicting, with a driver specific machine learning model within the system controller, a desired action based on the real-time data related to the location of the vehicle and the operating conditions of the vehicle and data from the database, initiating the predicted desired action, receiving input from an occupant within the vehicle, and updating the driver specific machine learning model.

According to another aspect, the method further includes training a generic machine learning model with data collected from a plurality of different vehicles located in a region and climate similar to the vehicle, uploading the generic machine learning model to the vehicle, and creating the driver specific machine learning model by updating the generic machine learning model.

According to another aspect, the initiating the desired action further includes prompting the occupant within the vehicle with a recommendation for the predicted desired action.

According to another aspect, the prompting the occupant within the vehicle with a recommendation for the predicted desired action further includes at least one of providing the recommendation for the predicted desired action audibly via a speaker connected to a human machine interface (HMI), and displaying the recommendation for the predicted desired action on a touch screen display of the HMI, and the receiving, with the system controller, input from the occupant within the vehicle includes at least one of receiving verbal input from the occupant within the vehicle via a microphone connected to the HMI, and receiving input from the occupant within the vehicle via the touch screen display.

According to another aspect, the displaying the recommendation for the predicted desired action on a touch screen display of the HMI further includes identifying an icon for the predicted desired action within a plurality of pre-defined menus that are adapted to be displayed on the touch screen display of the HMI, and displaying, on the touch screen display, only the icon for the predicted desired action.

According to another aspect, the initiating the desired action further includes automatically, with the system controller, initiating the desired action.

According to another aspect, the updating the driver specific machine learning model further includes receiving new data from other vehicles, selecting training data from the new data, and updating the driver specific machine learning model with the selected training data.

According to another aspect, the updating the driver specific machine learning model further includes comparing the input received from the occupant within the vehicle to the predicted desired action, and when the input from the occupant within the vehicle does not match the predicted desired action, updating the driver specific machine learning model.

According to another aspect, the method further includes receiving, via communication between the system controller and onboard systems within the vehicle, data related to an action being taken by the occupant within the vehicle, comparing the action being taken by the occupant within the vehicle to the predicted desired action, and at least one of when the action being taken by the occupant does not match the predicted desired action, prompting the occupant within the vehicle to verify that the occupant within the vehicle wants to proceed, and when the action being taken by the occupant is identified by the system controller as an inherently unsafe action, prompting the occupant within the vehicle with a warning message.

According to several aspects of the present disclosure, a system for providing situational recommendations within a vehicle includes a system controller in communication with a plurality of onboard sensors, the plurality of onboard sensors adapted to collect real-time data related to a location of the vehicle and operating conditions of the vehicle, a database in communication with the system controller adapted to store data related to past actions and data related to a location of the vehicle and operating conditions of the vehicle when such past actions occurred, the system controller including a driver specific machine learning model adapted to predict a desired action based on the real-time data related to the location and operating conditions of the vehicle and data from the database, the system controller further adapted to initiate the predicted desired action, receive input from an occupant within the vehicle, and update the driver specific machine learning model.

According to another aspect, the driver specific machine learning model is created by training a generic machine learning model with data collected from a plurality of different vehicles located in a region and climate similar to the vehicle, uploading the generic machine learning model to the vehicle, and creating the driver specific machine learning model by updating the generic machine learning algorithm.

According to another aspect, when initiating the desired action the system controller is further adapted to prompt the occupant within the vehicle with a recommendation for the predicted desired action.

According to another aspect, when prompting the occupant within the vehicle with a recommendation for the predicted desired action the system controller is further adapted to at least one of provide the recommendation for the predicted desired action audibly via a speaker connected to a human machine interface (HMI), and display the recommendation for the predicted desired action on a touch screen display of the HMI, and when receiving input from the occupant within the vehicle the system controller is further adapted to at least one of receive verbal input from the occupant within the vehicle via a microphone connected to the HMI, and receive input from the occupant within the vehicle via the touch screen display.

According to another aspect, when displaying the recommendation for the predicted desired action on the touch screen display of the HMI the system controller is further adapted to identify an icon for the predicted desired action within a plurality of pre-defined menus that are adapted to be displayed on the touch screen display of the HMI, and display, on the touch screen display, only the icon for the predicted desired action.

According to another aspect, when initiating the desired action the system controller is further adapted to automatically initiate the desired action.

According to another aspect, when updating the driver specific machine learning model the system controller is further adapted to receive new data from other vehicles, select training data from the new data, and update the driver specific machine learning model with the selected training data.

According to another aspect, when updating the driver specific machine learning model the system controller is further adapted to compare the input received from the occupant within the vehicle to the predicted desired action, and when the input from the occupant within the vehicle does not match the predicted desired action, update the driver specific machine learning model.

According to another aspect, the system controller is further adapted to receive, via communication between the system controller and onboard systems within the vehicle, data related to an action being taken by the occupant within the vehicle, comparing the action being taken by the occupant within the vehicle to the predicted desired action, and at least one of when the action being taken by the occupant does not match the predicted desired action, prompting the occupant within the vehicle to verify that the occupant within the vehicle wants to proceed with the action, and when the action being taken by the occupant is identified by the system controller as an inherently unsafe action, prompting the occupant within the vehicle with a warning message.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
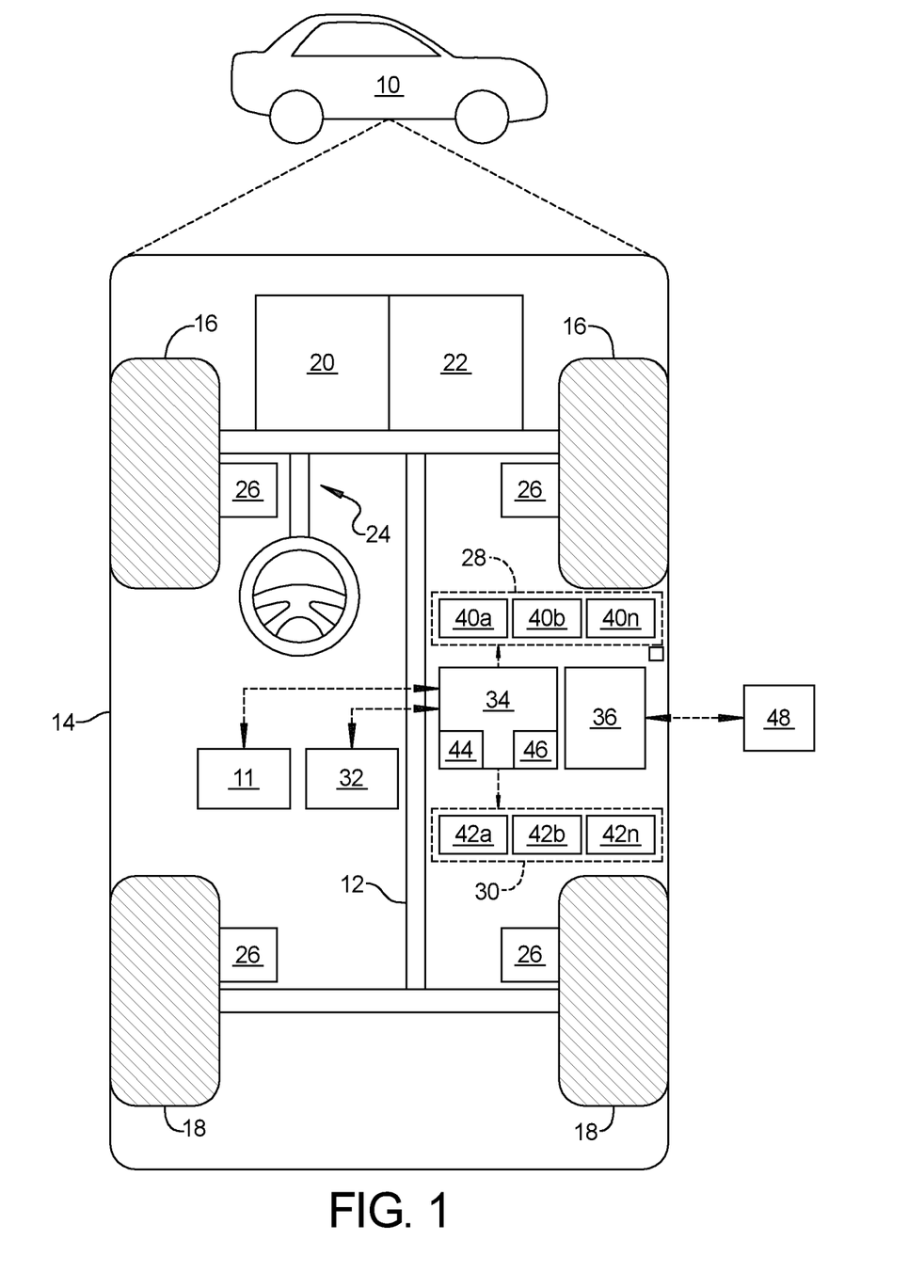
FIG. 1 is a schematic diagram of a vehicle having a system for providing recommended actions to an occupant according to an exemplary embodiment.

In accordance with an exemplary embodiment, FIG. 1 shows an electric vehicle 10 with an associated system 11 for providing recommendations to an occupant within the vehicle 10 in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
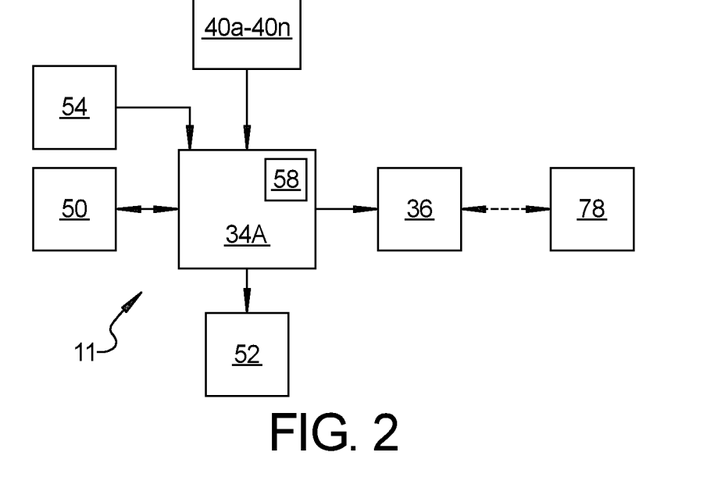
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with a human machine interface (HMI) 50, a vehicle control module (VCM) 52, a database 54 and the wireless communication module 36.

The system controller 34A, via communication with the plurality of onboard sensors 40a-40n is adapted to collect real-time data related to a location of the vehicle 10 and operating conditions of the vehicle 10. The database 54 is in communication with the system controller 34A and is adapted to store data related to past actions and data related to a location of the vehicle 10 and operating conditions of the vehicle 10 when such past actions occurred. Past actions may include actions taken by the occupant 56, such as opening a window, closing a window, opening a glove box, etc. The database 54 stores occurrences of such actions as well as data related to the location of the vehicle 10 and vehicle 10 operating conditions such as weather, speed, are other occupants in the vehicle, etc., when such actions occurred.

The system controller 34A includes a driver specific machine learning model 58 that is adapted to predict a desired action based on the real-time data related to the location and operating conditions of the vehicle 10 and data from the database 54. Various techniques are employed to extract meaningful features from sensor readings and data, including time-series analysis, frequency-domain analysis, and spatial-temporal patterns. The driver specific machine learning model may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN).

Thus, the system controller 34A uses the driver specific machine learning model 58 and machine learning techniques to predict a desired action that the occupant 56 will take based on analyzing the real-time data of the location of the vehicle 10 and the operating conditions of the vehicle 10 in light of data received from the database 54 including past actions and the locations and operating conditions of the vehicle 10 when such past actions occurred.

Once the system controller 34A, using the driver specific machine learning model 58, predicts a desired action, the system controller 34A is adapted to initiate the predicted desired action, receive input from the occupant 56 within the vehicle 10, and update the driver specific machine learning model 58.

Occupants within a vehicle often engage in repeated patterns. These patterns might include for example, opening the glovebox each time the occupant 56 arrives at a specific shopping mall in the vehicle 10, or, rolling the windows up each it rains or when the vehicle 10 is approaching a car wash. Observation of such patterns allows the driver specific machine learning model 58 to establish a pattern of behavior, and to predict future behavior based on such patterns.

Figure 3:
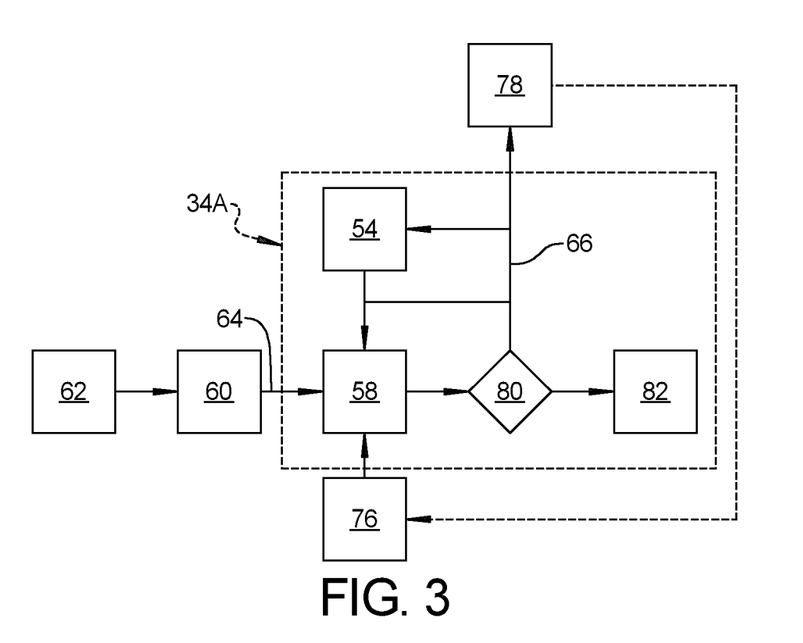
FIG. 3 is a schematic diagram illustrating how a driver specific machine learning model is created and updated.

Referring to FIG. 3, to create the driver specific machine learning model 58, first a generic machine learning model 60 is trained with data collected from a plurality of different vehicles located in a region and climate similar to the vehicle 10 (Offline Dataset 62). A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of patterns, including but not limited to Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The generic machine learning model 60 is trained on a labeled dataset and evaluated using various performance metrics such as accuracy, precision, recall, F1-score, and confusion matrix. The hyperparameters of the models are tuned to achieve optimal results. The generic machine learning model 60 is trained on training data and will learn to map input features to the corresponding pattern (actions) probabilities.

The generic machine learning model 60 is uploaded to the system controller 34A within the vehicle 10 (Transfer Learning 64). The generic machine learning model 60 provides a basis for creation of driver specific profiles and the driver specific machine learning model 58. The upload of the generic machine learning model 60 may be via a subscription-based service from a third party provider or the vehicle 10 manufacturer.

The driver specific machine learning model 58 is ultimately created by updating the generic machine learning model 60 (Online Learning 66). Once the generic machine learning model 60 is uploaded, data is collected as the occupant 56 uses the vehicle 10 day to day. As an occupant 56 uses the vehicle 10, the generic machine learning model 60 is updated to personalize the generic machine learning model 60 to the specific occupant 56 of the vehicle 10, thus creating the driver specific machine learning model 58, which is also continuously updated, as discussed below.

Figure 4:
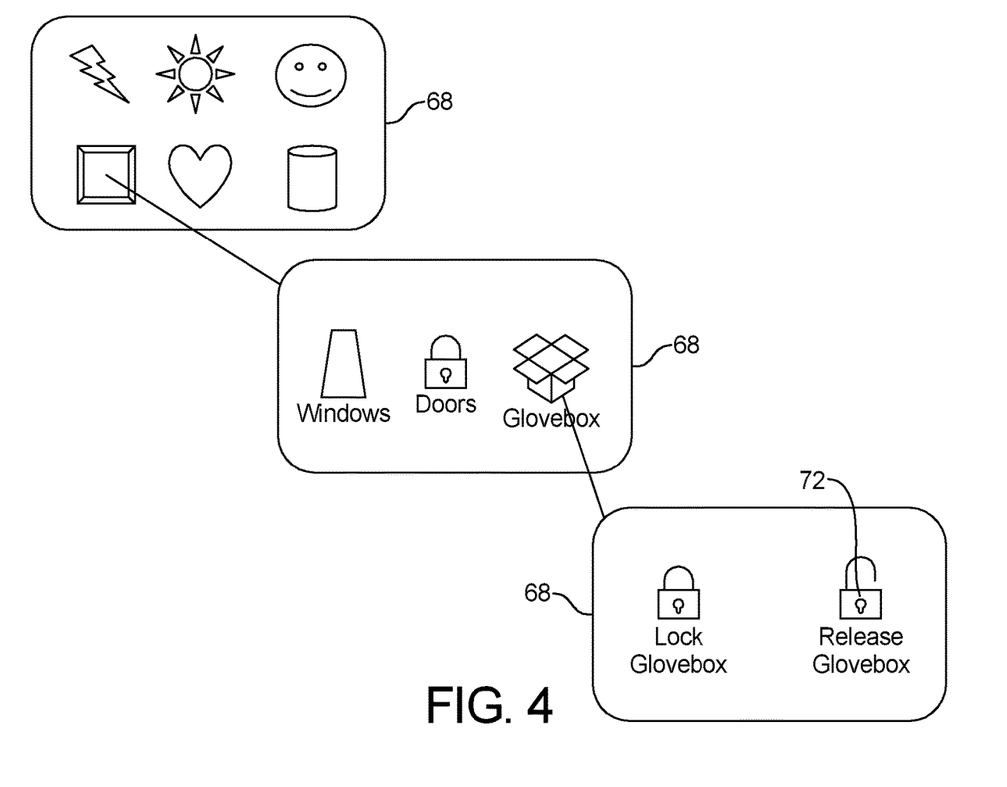
FIG. 4 is schematic graphic illustrating a plurality of menus displayed on a touch screen display.

In an exemplary embodiment, when initiating the desired action the system controller 34A is further adapted to prompt the occupant 56 within the vehicle 10 with a recommendation for the predicted desired action. For example, if the occupant 56 and vehicle 10 are approaching the specific shopping mall previously mentioned, the driver specific machine learning model 58 accesses data from the database 54 and detects a pattern that there is a high probability that the occupant 56 will open the glove box shortly after placing the vehicle 10 in park when located at the shopping mall. Referring to FIG. 4, in order to open the glove box, the occupant 56 must navigate through multiple menus on a touch screen display 68 of the HMI 50, however, the driver specific machine learning model 58 predicts the desired action (that the occupant 56 will want to open the glove box shortly after placing the vehicle 10 in park when located at the shopping mall), and prompts the occupant 56 to see if the occupant 56 wants to open the glove box.

Figure 5:
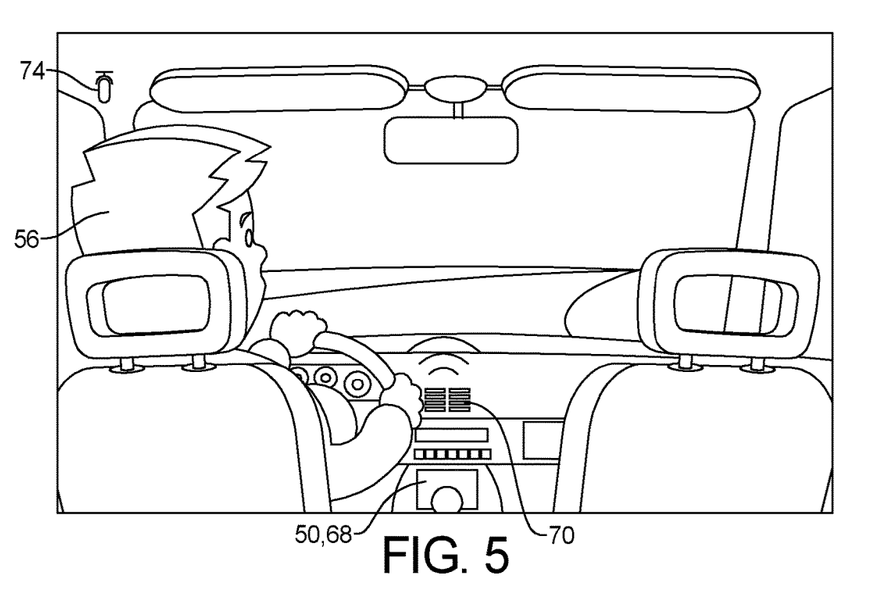
FIG. 5 is a schematic graphic of an interior of the vehicle shown in FIG. 1.

Referring to FIG. 5, in an exemplary embodiment, when prompting the occupant 56 within the vehicle 10 with a recommendation for the predicted desired action the system controller 34A is further adapted to provide the recommendation for the predicted desired action audibly via a speaker 70 connected to the HMI 50. Thus, the system controller 34A broadcasts, via the speaker 70, an audible message to the occupant 56, such as "We're at the mall, would you like to open the glove box?".

In another exemplary embodiment, when prompting the occupant 56 within the vehicle 10 with a recommendation for the predicted desired action the system controller 34A is further adapted to display the recommendation for the predicted desired action on the touch screen display 68 of the HMI 50. Thus, the system controller 34A may display a textual message "We're at the mall, would you like to open the glove box?" on the touch screen display 68 of the HMI 50.

In another exemplary embodiment, the system controller 34A identifies an icon 72 for the predicted desired action within a plurality of pre-defined menus that are adapted to be displayed on the touch screen display 68 of the HMI 50, and displays only the icon 72 for the predicted desired action.

Figure 6:
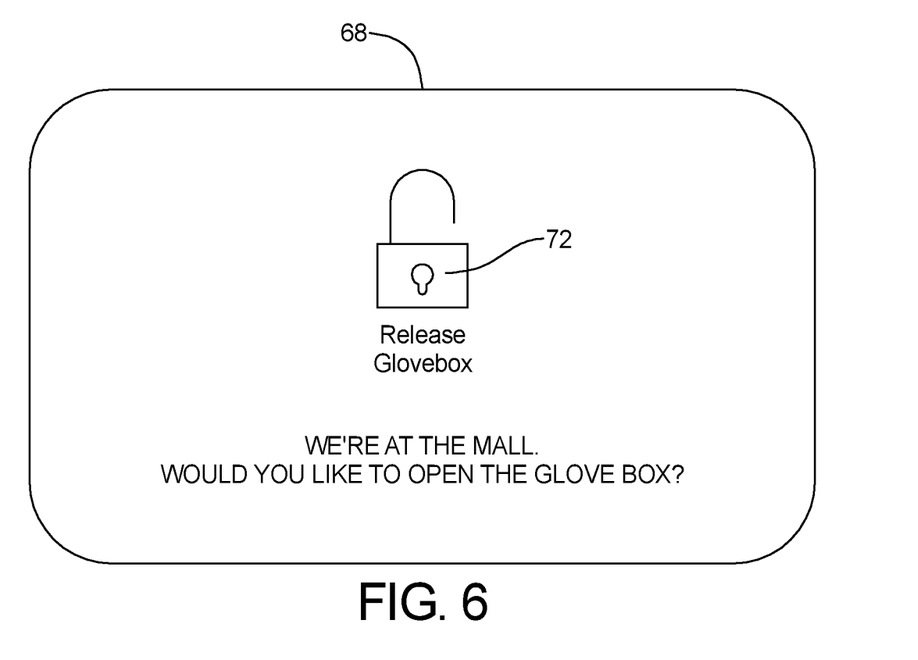
FIG. 6 is a front view of a touch screen display wherein an icon for releasing a glove box and a message are displayed.

Referring again to FIG. 4, in the present example, normally to open the glove box, the occupant 56 would need to navigate through multiple menus on the touch screen display 68 of the HMI 50 to find the icon 72 representing the glove box release, wherein the occupant 56 would touch the icon 72 to open the glove box. Referring to FIG. 6, in this instance, the system controller 34A identifies the icon 72 for the glove box, and de-clutters the touch screen display 68 for the occupant 56 by displaying only the icon 72 for the glove box release, and the message "We're at the mall. Would you like to open the glove box?". This is an example of location-based dynamic and personalized adaptation of an HMI interaction experience.

Referring again to FIG. 5, when receiving input from the occupant 56 within the vehicle 10 the system controller 34A is further adapted to receive verbal input from the occupant 56 within the vehicle 10 via a microphone 74 connected to the HMI 50. Thus, when the system controller 34A provides an audible prompt with a predicted desired action, such as "We're at the mall. Would you like to open the glove box?", the occupant 56 can respond, such as by saying "Yes" or "No".

In another exemplary embodiment, when receiving input from the occupant 56 within the vehicle 10 the system controller 34A is further adapted to receive input from the occupant 56 within the vehicle 10 via the touch screen display 68. Thus, when prompted with a message on the touch screen display 68, the occupant 56 can choose to take the predicted desired action or not. For example, referring to FIG. 6, the system controller 34A prompts the occupant 56 by displaying the icon 72 for releasing the glove box and the message "We're at the mall. Would you like to open the glove box?", wherein, if the occupant 56 does want to open the glove box, then the occupant 56 can touch the icon 72 on the display 68 to do so. If the occupant 56 does not want to open the glove box, the occupant 56 does nothing, and after an amount of time, the system controller 34A recognizes the lack of response from the occupant 56 as a negative response.

In another exemplary embodiment, when initiating the desired action the system controller 34A is further adapted to automatically initiate the desired action. Thus, in the example above, when the occupant 56 arrives at the shopping mall in the vehicle 10, the driver specific machine learning model 58 accesses data from the database 54 and detects a pattern that there is a high probability that the occupant 56 will open the glove box shortly after placing the vehicle 10 in park when located at the shopping mall. Thus, once the occupant 56 puts the vehicle 10 in park, the system controller 34A automatically opens the glove box. Such automatic actions may be authorized ahead of time by the occupant 56, and may be limited to rudimentary actions, such as opening/closing a window, wherein actions like placing the vehicle 10 into park could not be initiated automatically. In all cases, the system controller 34A will not initiate, either automatically or in response to input from the occupant 56, any action that would violate safety protocols.

Further, the automatic initiation of the predicted desired action may only take place when the probability, calculated by the driver specific machine learning model 58, that the occupant 56 will take the predicted action exceeds a certain threshold. For example, the driver specific machine learning model 58 accesses data from the database 54 and detects a pattern that there is a high probability that the occupant 56 will open the glove box shortly after placing the vehicle 10 in park when located at the shopping mall. In an exemplary embodiment, the system controller 34A will prompt the occupant 56 with a recommendation for the predicted desired action (opening the glove box) if the probability, as calculated by the driver specific machine learning model 58, that the occupant 56 will open the glove box exceeds 50%, and the system controller 34A will automatically open the glove box if the probability, as calculated by the driver specific machine learning model 58, that the occupant 56 will open the glove box exceeds 90%.

In another exemplary embodiment, when prompting the occupant 56 within the vehicle 10 with a recommendation for the predicted desired action the system controller 34A is further adapted to provide the recommendation for the predicted desired action via a personal device of the occupant 56. For example, if the occupant has left the vehicle 10, and weather conditions call for rain, or sensors 40a-40n within the vehicle 10 detect that it is raining, the system controller 34A can prompt the occupant 56, via a personal device, such as a smart phone or smart watch, to suggest closing the windows to the occupant 56. In another example, the system controller 34A identifies a pattern with the machine learning model 58 wherein each time the occupant 56 arrives at a specific destination, the occupant 56 locks the vehicle 10 doors upon exiting the vehicle 10 an no other passengers are present within the vehicle 10. Thus, when the occupant 56 exits the vehicle 10, the system controller 34A prompts the occupant 56, via a personal device, to suggest to the occupant 56 that the vehicle 10 doors should be locked.

Referring again to FIG. 3, in an exemplary embodiment, when updating the driver specific machine learning model 58 the system controller 34A is further adapted to receive new data 76 from other vehicles, select training data from the new data 76, and update the driver specific machine learning model 58 with the selected training data. New data 76 from other vehicles may be received via upload from a database 78 supported by a subscription service or the vehicle manufacturer, or that receives data from other vehicles that are similarly situated.

In another exemplary embodiment, when updating the driver specific machine learning model 58 the system controller 34A is further adapted to compare, at block 80, the input received from the occupant 56 within the vehicle 10 to the predicted desired action, and, when the input from the occupant 56 within the vehicle 10 does not match the predicted desired action, update the driver specific machine learning model 58 (Online Learning 66).

For example, when the occupant 56 arrives at the shopping mall in the vehicle 10, the driver specific machine learning model 58 accesses data from the database 54 and detects a pattern that there is a high probability that the occupant 56 will open the glove box shortly after placing the vehicle 10 in park when located at the shopping mall. Thus, the system controller 34A prompts the occupant 56 with a recommendation for the predicted desired action (opening the glove box).

If, at block 80 of FIG. 3, the occupant 56 within the vehicle 10 accepts the recommendation and either verbally or by touching the display screen 68 of the HMI 50, opens the glove box, then the system controller 34A will take no further action (block 82), as the occupant 56 is acting consistently with the prediction of the driver specific machine learning model 58, and thus no updating is needed. However, if the occupant 56 within the vehicle 10 does not accept the recommendation and does not open the glove box, then the system controller 34A will update the driver specific machine learning model 58 (Online Learning 66). The occurrence of the occupant 56 not following the recommendation of the predicted desired action will result in a lower calculated probability of the occupant 56 opening the glove box at the next occurrence of arriving at the shopping mall. The system controller 34A will push data related to this occurrence to the database 54, and may also push this data to the (cloud-based) database 78 supported by a subscription service or the vehicle manufacturer, or that receives data from other vehicles that are similarly situated, and provides new data for updates to other vehicles.

In another exemplary embodiment, the system controller 34A is further adapted to receive, via communication between the system controller 34A and onboard systems within the vehicle 10, data related to an action being taken by the occupant 56 within the vehicle 10, compare the action being taken by the occupant 56 within the vehicle 10 to the predicted desired action, and, when the action being taken by the occupant 56 does not match the predicted desired action, prompting the occupant 56 within the vehicle 10 to verify that the occupant 56 within the vehicle 10 wants to proceed with the action.

For example, when the occupant 56 arrives at the shopping mall in the vehicle 10, the driver specific machine learning model 58 accesses data from the database 54 and detects a pattern that there is a high probability that the occupant 56 will open the glove box shortly after placing the vehicle 10 in park when located at the shopping mall. Thus, the system controller 34A prompts the occupant 56 with a recommendation for the predicted desired action (opening the glove box). However, rather than open the glove box, the occupant 56 within the vehicle 10 opens the door to leave the vehicle 10. The system controller 34A compares the action being taken (opening the door) to the recommended predicted desired action (opening the glove box), and since they do not match, prompts the occupant 56 of the vehicle 10 to verify that the occupant 56 does not want to open the glove box and instead wants to proceed with opening the door.

In another example, the system controller 34A detects that the occupant 56 has taken an action that is out of the ordinary. For instance, the occupant 56 accidentally pushes a button to open the trunk of the vehicle 10 while the vehicle 10 is traveling down the road at a high rate of speed. The database 54 includes no occurrences of the occupant 56 opening the trunk while the vehicle 10 is moving, and thus the driver specific machine learning model 58 identifies this action as an anomaly and prompts the occupant 56 to verify that the occupant 56 really wants to open the trunk. In addition, with or without any historical pattern, the system controller 34A may identify the action as inherently unsafe, and thus the system controller 34A prompts the occupant 56 to verify that the occupant 56 really wants to perform the action. Such inherently unsafe actions would not be driver specific, and would be part of the generic machine learning model 60, despite any personalization of the driver specific machine learning model 58. In the example above, the generic machine learning model 60 identifies opening the trunk as inherently unsafe at speeds in excess of, for example, ten MPH. The prompt provided by the system controller 34A, in addition to verifying that the occupant 56 wants to open the trunk, may also provide a warning message informing the occupant that the action is unsafe.

The onboard safety systems of the vehicle 10 may preclude certain identified inherently unsafe actions, such as opening the trunk of the vehicle 10 while traveling at high speeds. In such instances, the system controller 34A takes no action, and may provide a prompt to the occupant that simply informs the occupant 56 that the action cannot be taken. In other instances, the action may not be advisable, but is identified as an anomaly or somewhat unsafe. For example, the occupant 56 accidentally pushes a button to open the trunk of the vehicle 10 while the vehicle 10 is within a car wash. The database 54 includes no occurrences of the occupant 56 opening the trunk while the vehicle 10 is in a car wash, and further the generic machine learning model 60 is programmed that the trunk should not be opened when the vehicle 10 is located within a car wash. Thus the driver specific machine learning model 58 identifies this action as an anomaly and prompts the occupant 56 to verify that the occupant 56 really wants to open the trunk while the vehicle 10 is in the car wash. The prompt may include a message indicating that it may be unwise to open the trunk while the vehicle 10 is in the car wash, but if the occupant 56 is insistent and provides input verifying that the occupant 56 wants to open the trunk, then the system controller 34A will do so.

Figure 7:
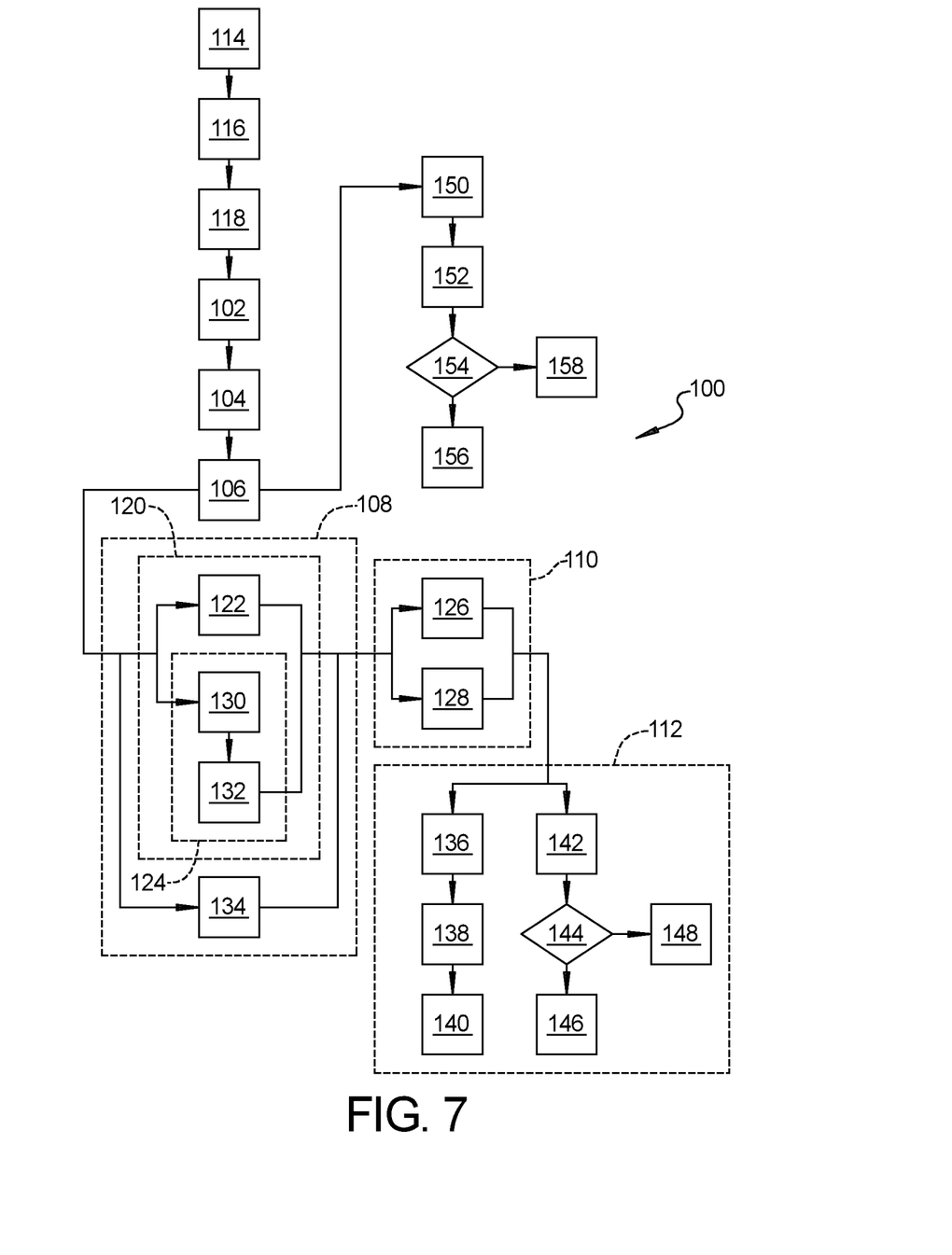
FIG. 7 is a flow chart illustrating a method of providing recommendations to an occupant within a vehicle according to an exemplary embodiment.

Referring to FIG. 7, a method 100 of providing situational recommendations within a vehicle 10 includes, beginning at block 102, collecting, with a plurality of onboard sensors 40a-40n in communication with a system controller 34A, real-time data related to a location of the vehicle 10 and operating conditions of the vehicle 10, moving to block 104, accessing, with the system controller 34A, a database 54 of stored data related to past actions and data related to a location of the vehicle 10 and operating conditions of the vehicle 10 when such past actions occurred, moving to block 106, predicting, with a driver specific machine learning model 58 within the system controller 34A, a desired action based on the real-time data related to the location of the vehicle 10 and the operating conditions of the vehicle 10 and data from the database 54, moving to block 108, initiating the predicted desired action, moving to block 110, receiving input from an occupant 56 within the vehicle 10, and, moving to block 112, updating the driver specific machine learning model 58.

In an exemplary embodiment, the method 100 further includes, moving to block 114, training a generic machine learning model 60 with data collected from a plurality of different vehicles located in a region and climate similar to the vehicle 10, moving to block 116, uploading the generic machine learning model 60 to the vehicle 10, and, moving to block 118, creating the driver specific machine learning model 58 by updating the generic machine learning model 60.

In an exemplary embodiment, the initiating the desired action at block 108 further includes, moving to block 120, prompting the occupant 56 within the vehicle 10 with a recommendation for the predicted desired action.

In an exemplary embodiment, the prompting the occupant 56 within the vehicle 10 with a recommendation for the predicted desired action at block 120 further includes at least one of, moving to block 122, providing the recommendation for the predicted desired action audibly via a speaker 70 connected to a human machine interface (HMI) 50, and, moving to block 124, displaying the recommendation for the predicted desired action on a touch screen display 68 of the HMI 50.

In another exemplary embodiment, the receiving, with the system controller 34A, input from the occupant 56 within the vehicle 10 at block 110, includes at least one of, moving to block 126, receiving verbal input from the occupant 56 within the vehicle 10 via a microphone 74 connected to the HMI 50, and, moving to block 128, receiving input from the occupant 56 within the vehicle 10 via the touch screen display 68.

In another exemplary embodiment, the displaying the recommendation for the predicted desired action on a touch screen display 68 of the HMI 50 at block 124 further includes, moving to block 130, identifying an icon 72 for the predicted desired action within a plurality of pre-defined menus that are adapted to be displayed on the touch screen display 68 of the HMI 50, and, moving to block 132, displaying, on the touch screen display 68, only the icon 72 for the predicted desired action.

In another exemplary embodiment, the initiating the desired action at block 108 further includes, moving to block 134, automatically, with the system controller 34A, initiating the desired action.

In another exemplary embodiment, the updating the driver specific machine learning model 58 at block 112 further includes, moving to block 136, receiving new data 76 from other vehicles, moving to block 138, selecting training data from the new data 76, and, moving to block 140, updating the driver specific machine learning model 58 with the selected training data.

In another exemplary embodiment, the updating the driver specific machine learning model 58 at block 112 further includes, moving to block 142, comparing the input received from the occupant 56 within the vehicle 10 to the predicted desired action, and, moving to block 144, when the input from the occupant 56 within the vehicle 10 does not match the predicted desired action, moving to block 146, updating the driver specific machine learning model 58. When, at block 144, the input from the occupant 56 within the vehicle 10 does match the predicted desired action, moving to block 148, the system controller 34A takes no action.

In another exemplary embodiment, after predicting, with a driver specific machine learning model 58 within the system controller 34A, a desired action based on the real-time data related to the location of the vehicle 10 and the operating conditions of the vehicle 10 and data from the database 54 at block 106, the method 100 includes, moving to block 150, receiving, via communication between the system controller 34A and onboard systems within the vehicle 10, data related to an action being taken by the occupant 56 within the vehicle 10, moving to block 152, comparing the action being taken by the occupant 56 within the vehicle 10 to the predicted desired action, and, moving to block 154, when the action being taken by the occupant 56 does not match the predicted desired action, moving to block 156, prompting the occupant 56 within the vehicle 10 to verify that the occupant 56 within the vehicle 10 wants to proceed. When, at block 154, the action being taken by the occupant 56 does match the predicted desired action, moving to block 158, the system controller 34A takes no action.

A system and method of the present disclosure offers the advantage of predicting a desired action by an occupant within a vehicle and prompting the occupant to make selection of the predicted desired action easy and streamlined, or initiating the predicted desired action automatically.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing situational recommendations within a vehicle, comprising:
   collecting, with a plurality of onboard sensors in communication with a system controller, real-time data related to a location of the vehicle and operating conditions of the vehicle;
   accessing, with the system controller, a database of stored data related to past actions and data related to a location of the vehicle and operating conditions of the vehicle when such past actions occurred;
   predicting, with a driver specific machine learning model within the system controller, a desired action based on the real-time data related to the location of the vehicle and the operating conditions of the vehicle and data from the database, including at least one of:
      identifying a pattern of behavior indicating that the occupant takes a specific action each time the occupant arrives at a specific location; and
      identifying a pattern of behavior indicating that the occupant takes a specific action each time a specific condition exists;
   probabilistically predicting, with the machine learning model, the desired action based on the identified pattern of behavior;
   initiating the predicted desired action, including:
      when a probability of the desired action exceeds fifty percent, prompting the occupant within the vehicle with a recommendation for the predicted desired action; and
      when the probability of the desired action exceeds ninety percent, automatically initiating the predicted desired action;
   receiving input from an occupant within the vehicle;
   updating the driver specific machine learning model;
   receiving, via communication between the system controller and onboard systems within the vehicle, data related to an action being taken by the occupant within the vehicle;
   comparing the action being taken by the occupant within the vehicle to the predicted desired action, and at least one of:
      when the action being taken by the occupant does not match the predicted desired action, prompting the occupant within the vehicle to verify that the occupant within the vehicle wants to proceed with the action;
      when the action being taken by the occupant is identified, by the machine learning model, as an anomaly, prompting the occupant within the vehicle to verify that the occupant within the vehicle wants to proceed with the action; and
      when the action being taken by the occupant is identified by the system controller as an inherently unsafe action, prompt the occupant within the vehicle with a warning message.

2. The method of claim 1, further including:
   training a generic machine learning model with data collected from a plurality of different vehicles located in a region and climate similar to the vehicle;
   uploading the generic machine learning model to the vehicle; and
   creating the driver specific machine learning model by updating the generic machine learning model.

3. The method of claim 2, wherein:
   the prompting the occupant within the vehicle with a recommendation for the predicted desired action further includes at least one of:
   providing the recommendation for the predicted desired action audibly via a speaker connected to a human machine interface (HMI); and
   displaying the recommendation for the predicted desired action on a touch screen display of the HMI; and
   the receiving, with the system controller, input from the occupant within the vehicle includes at least one of:
   receiving verbal input from the occupant within the vehicle via a microphone connected to the HMI; and
   receiving input from the occupant within the vehicle via the touch screen display.

4. The method of claim 3, wherein the displaying the recommendation for the predicted desired action on a touch screen display of the HMI further includes:
   identifying an icon for the predicted desired action within a plurality of pre-defined menus that are adapted to be displayed on the touch screen display of the HMI; and
   displaying, on the touch screen display, only the icon for the predicted desired action.

5. The method of claim 1, wherein the updating the driver specific machine learning model further includes:
   receiving new data from other vehicles;
   selecting training data from the new data; and
   updating the driver specific machine learning model with the selected training data.

6. The method of claim 1, wherein the updating the driver specific machine learning model further includes:
   comparing the input received from the occupant within the vehicle to the predicted desired action; and
   when the input from the occupant within the vehicle does not match the predicted desired action, updating the driver specific machine learning model.

7. A system for providing situational recommendations within a vehicle, comprising:
   a system controller in communication with a plurality of onboard sensors, the plurality of onboard sensors adapted to collect real-time data related to a location of the vehicle and operating conditions of the vehicle;
   a database in communication with the system controller adapted to store data related to past actions and data related to a location of the vehicle and operating conditions of the vehicle when such past actions occurred; and
   the system controller including a driver specific machine learning model adapted to predict a desired action based on the real-time data related to the location and operating conditions of the vehicle and data from the database, including at least one of:
      identify a pattern of behavior indicating that the occupant takes a specific action each time the occupant arrives at a specific location; and
      identify a pattern of behavior indicating that the occupant takes a specific action each time a specific condition exists;
   the machine learning model further adapted to probabilistically predict the desired action based on the identified pattern of behavior;
   the system controller further adapted to:
      initiate the predicted desired action, including:
         when a probability of the desired action exceeds fifty percent, prompt the occupant within the vehicle with a recommendation for the predicted desired action; and when the probability of the desired action exceeds ninety percent, automatically initiate the predicted desired action;
receive input from an occupant within the vehicle;
update the driver specific machine learning model;
receive, via communication between the system controller and onboard systems within the vehicle, data related to an action being taken by the occupant within the vehicle;
compare the action being taken by the occupant within the vehicle to the predicted desired action, and at least one of:
when the action being taken by the occupant does not match the predicted desired action, prompt the occupant within the vehicle to verify that the occupant within the vehicle wants to proceed with the action;
when the action being taken by the occupant is identified, by the machine learning model, as an anomaly, prompt the occupant within the vehicle to verify that the occupant within the vehicle wants to proceed with the action; and
when the action being taken by the occupant is identified by the system controller as an inherently unsafe action, prompt the occupant within the vehicle with a warning message.

8. The system of claim 7, wherein the driver specific machine learning model is created by:
training a generic machine learning model with data collected from a plurality of different vehicles located in a region and climate similar to the vehicle;
uploading the generic machine learning model to the vehicle; and
creating the driver specific machine learning model by updating the generic machine learning model.

9. The system of claim 8, wherein:
when prompting the occupant within the vehicle with a recommendation for the predicted desired action the system controller is further adapted to at least one of:
provide the recommendation for the predicted desired action audibly via a speaker connected to a human machine interface (HMI); and
display the recommendation for the predicted desired action on a touch screen display of the HMI; and
when receiving input from the occupant within the vehicle the system controller is further adapted to at least one of:
receive verbal input from the occupant within the vehicle via a microphone connected to the HMI; and
receive input from the occupant within the vehicle via the touch screen display.

10. The system of claim 9, wherein when displaying the recommendation for the predicted desired action on the touch screen display of the HMI the system controller is further adapted to:
identify an icon for the predicted desired action within a plurality of pre-defined menus that are adapted to be displayed on the touch screen display of the HMI; and
display, on the touch screen display, only the icon for the predicted desired action.

11. The system of claim 7, wherein when updating the driver specific machine learning model the system controller is further adapted to:
receive new data from other vehicles;
select training data from the new data; and
update the driver specific machine learning model with the selected training data.

12. The system of claim 7, wherein when updating the driver specific machine learning model the system controller is further adapted to:
compare the input received from the occupant within the vehicle to the predicted desired action; and
when the input from the occupant within the vehicle does not match the predicted desired action, update the driver specific machine learning model.

13. A vehicle having a system for providing situational recommendations, the system comprising:
a system controller in communication with a plurality of onboard sensors, the plurality of onboard sensors adapted to collect real-time data related to a location of the vehicle and operating conditions of the vehicle;
a database in communication with the system controller adapted to store data related to past actions and data related to a location of the vehicle and operating conditions of the vehicle when such past actions occurred;
the system controller including a driver specific machine learning model adapted to predict a desired action based on the real-time data related to the location and operating conditions of the vehicle and data from the database, including at least one of:
identify a pattern of behavior indicating that the occupant takes a specific action each time the occupant arrives at a specific location; and
identify a pattern of behavior indicating that the occupant takes a specific action each time a specific condition exists; and
the machine learning model further adapted to probabilistically predict the desired action based on the identified pattern of behavior;
the system controller further adapted to:
initiate the predicted desired action, including:
when a probability of the desired action exceeds fifty percent, prompt the occupant within the vehicle with a recommendation for the predicted desired action by at least one of: providing the recommendation for the predicted desired action audibly via a speaker connected to a human machine interface (HMI), and displaying the recommendation for the predicted desired action on a touch screen display of the HMI; and
when the probability of the desired action exceeds ninety percent, automatically initiate the predicted desired action;
receive input from an occupant within the vehicle by at least one of: receiving verbal input from the occupant within the vehicle via a microphone connected to the HMI, and receiving input from the occupant within the vehicle via the touch screen display; and
update the driver specific machine learning model by at least one of:
receiving new data from other vehicles, selecting training data from the new data, and updating the driver specific machine learning model with the selected training data; and
comparing the input received from the occupant within the vehicle to the predicted desired action, and when the input from the occupant within the vehicle does not match the predicted desired action, updating the driver specific machine learning model.

14. The vehicle of claim 13, wherein the system controller is further adapted to:
- receive, via communication between the system controller and onboard systems within the vehicle, data related to an action being taken by the occupant within the vehicle;
- compare the action being taken by the occupant within the vehicle to the predicted desired action; and
  - when the action being taken by the occupant does not match the predicted desired action, prompt the occupant within the vehicle to verify that the occupant within the vehicle wants to proceed with the action; and
  - when the action being taken by the occupant is identified, by the machine learning model, as an anomaly, prompt the occupant within the vehicle to verify that the occupant within the vehicle wants to proceed with the action.

15. The system of claim 1, wherein the prompting the occupant within the vehicle with a recommendation for the predicted desired action further includes prompting the occupant, after the occupant has left the vehicle, via wireless communication with a personal device, recommending the predicted desired action.

16. The system of claim 15, wherein the prompting the occupant within the vehicle with a recommendation for the predicted desired action further includes, upon identifying a pattern of behavior indicating that the occupant locks the vehicle doors whenever at a current location, prompting the occupant, after the occupant has left the vehicle, via wireless communication with the personal device, to lock the vehicle doors.

17. The system of claim 15, wherein the prompting the occupant within the vehicle with a recommendation for the predicted desired action further includes, upon identifying a pattern of behavior indicating that the occupant closes windows of the vehicle when it is raining, prompting the occupant, after the occupant has left the vehicle, via wireless communication with the personal device, to close the windows of the vehicle when real-time data related to the location of the vehicle indicate that it is currently raining or that weather conditions predict rain.

18. The system of claim 7, wherein the system controller is further adapted to prompt the occupant, after the occupant has left the vehicle, via wireless communication with a personal device, to recommend the predicted desired action.

19. The system of claim 18, wherein upon identifying a pattern of behavior indicating that the occupant locks the vehicle doors whenever at a current location, the system controller is adapted to prompt the occupant, after the occupant has left the vehicle, via wireless communication with the personal device, to lock the vehicle doors.

20. The system of claim 18, wherein upon identifying a pattern of behavior indicating that the occupant closes windows of the vehicle when it is raining, the system controller is adapted to prompt the occupant, after the occupant has left the vehicle, via wireless communication with the personal device, to close the windows of the vehicle when real-time data related to the location of the vehicle indicate that it is currently raining or that weather conditions predict rain.

* * * * *